United States Patent [19]

Ruelle

[11] Patent Number: 5,939,027
[45] Date of Patent: Aug. 17, 1999

[54] PROCESS FOR DISCHARGING A REACTOR

[75] Inventor: Jean-Jacques Ruelle, St-Remy-Geest, Belgium

[73] Assignee: Solvay Polyoletins Europe-Belsium (SA), Brussels, Belgium

[21] Appl. No.: 08/843,213

[22] Filed: Apr. 15, 1997

Related U.S. Application Data

[63] Continuation of application No. 08/243,781, May 17, 1994, abandoned.

[30] Foreign Application Priority Data

May 27, 1993 [BE] Belgium ............................. 09300548

[51] Int. Cl.⁶ ........................................................ F27B 15/09
[52] U.S. Cl. .......................... 422/145; 198/661; 198/676; 526/88; 526/901
[58] Field of Search ........................... 422/145; 198/661, 198/676; 526/88, 901

[56] References Cited

U.S. PATENT DOCUMENTS

| | | | |
|---|---|---|---|
| 2,921,054 | 1/1960 | Kennedy | 526/901 |
| 2,924,591 | 2/1960 | Roelen | 526/901 |
| 3,023,203 | 2/1962 | Dye | 526/901 |
| 3,440,238 | 4/1969 | Foglia | 526/901 |
| 3,580,389 | 5/1971 | Nonnenmacher | 198/676 |
| 4,502,820 | 3/1985 | Fujii et al. | |
| 4,958,006 | 9/1990 | Bernier et al. | 526/901 |
| 5,052,874 | 10/1991 | Johanson | 198/661 |

FOREIGN PATENT DOCUMENTS

| | | |
|---|---|---|
| 0071430 | 2/1983 | European Pat. Off. . |
| 1046157 | 12/1953 | France . |
| 3545339 | 7/1987 | Germany . |

OTHER PUBLICATIONS

"Periodic Table Of The Elements"; Handbook of Chemistry and Physics, 50th edition, p. B–3, 1969–1970.

"Schneckenmachinen in der Verfahrenstechnik" (Screw Extruders for the Processing Technology), pp. 60–61, 121–128, 151–154.

Primary Examiner—Timothy McMahon
Attorney, Agent, or Firm—Spencer & Frank

[57] ABSTRACT

A process for discharging a reactor characterized by reducing the volume of a powder without compacting it, including treating the powder in a densification zone including at least one Archimedes' screw arranged in a barrel. The Archimedes' screw may also have both a reduction in pitch and an increase in diameter of the shaft. The densification zone may also contain two co- or counterrotating screws arranged in a barrel and exhibiting a reduction in the pitch of the screws. Densification zones consisting of two co-rotating screws give particularly good results.

28 Claims, 1 Drawing Sheet

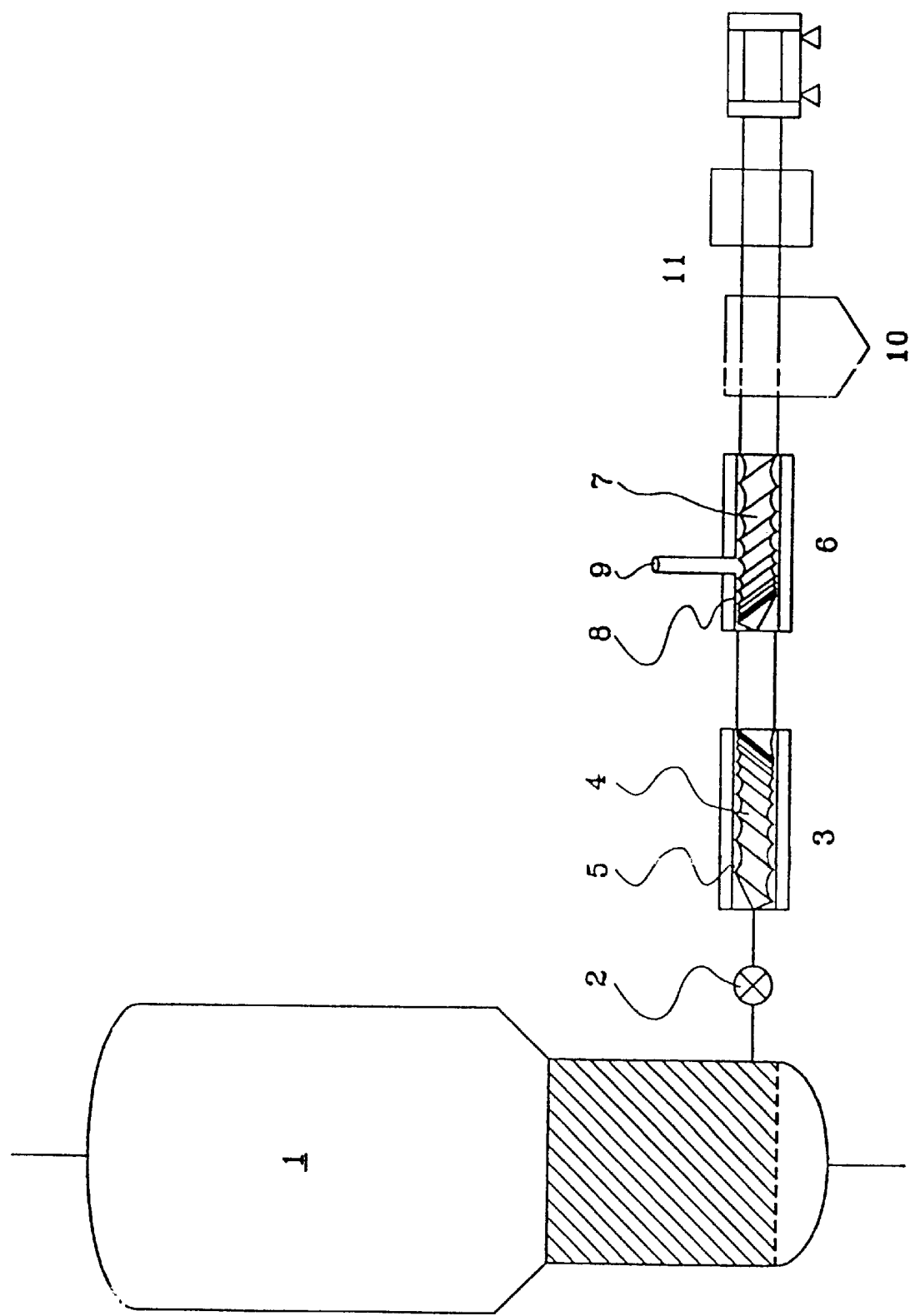

PROCESS FOR DISCHARGING A REACTOR

CROSS REFERENCE TO RELATED APPLICATION

This application is a continuation of application Ser. No. 08/243,781 filed May 17, 1994, and now abandoned. This application is also related to Belgian Application No. 09300548 filed May 27, 1993, to which the right of priority has been, and is, claimed under 35 U.S.C. §119.

FIELD OF THE INVENTION

The present invention relates to a process and a device for discharging a reactor. It relates more particularly to a process and a device for discharging a reactor containing both a powder and a gas under pressure, such as, for example, a polymerization reactor or a fluidized bed reactor. Finally, the present invention relates to a process for polymerizing α-olefins, employing this device.

TECHNOLOGY REVIEW

It is known to polymerize α-olefins by means of a catalyst system containing a compound of a transition metal belonging to groups IIIB, IVb, Vb and VIb of the Periodic Table (version published in the Handbook of Chemistry and Physics, 50th edition, page B-3, 1969–1970) and an activator chosen from organometallic compounds of groups I to III of the Periodic Table. The organometallic compound is preferably an aluminium compound and the transition metal compound is a solid based on titanium. It is also known to perform this polymerization by keeping the monomer(s) in gaseous phase. Such a polymerization is then generally performed in fluidized bed reactors, which are in most cases reactors with a vertical axis, in which the particles of polymer being formed are kept in the fluidized state by a rising gas stream containing the olefin or the olefins to be polymerized. In its lower part, such a reactor generally includes a perforated plate, commonly called a fluidization grid, which makes it possible to distribute the gas stream needed to keep the polymer particles in the fluidized state. A side pipework makes it possible to discharge from the reactor a proportion of the polymer which is formed therein.

A known process for performing this discharging includes the noncontinuous transfer, through the intermediacy of a gas stream and by means of a suitable device with valves, of a proportion of the fluidized bed containing the polymer dispersed in the gaseous phase from a point situated below the top of the fluidized bed and above the fluidization grid towards a series of vessels operating at a pressure lower than that in the polymerization reactor. In these vessels the solid is separated from the gaseous phase by gravity and the latter phase is reintroduced directly or indirectly into the polymerization reactor at a point situated above the transfer point. The solid is then conveyed to the next vessel (EP-0071430).

The discharge systems belonging to the prior art have a certain number of disadvantages, namely:

their use is relatively complicated because of the large number of valves which they contain. Furthermore, since these valves are continually actuated, they present wear problems requiring extensive maintenance;

fluctuations which are sometimes large are observed in the pressure prevailing in the reactor;

since the discharged part of the fluidized bed contains a proportion of the gaseous phase originating from the reactor and containing the monomers, the polymerization reaction continues in a disordered manner in the discharge vessels. In addition, in most cases it is found necessary to degas the polymer powders thus discharged before they are stored and/or handled, and this involves additional treatments of the gases produced by this degassing;

finally, since the polymer powders are compacted by gravitation in the discharge vessels, agglomerates can be seen to form, which are liable to perturb or even to block the discharge process. Such disadvantages are chiefly encountered during the discharging of sticky powders.

SUMMARY OF THE INVENTION

The present invention is therefore aimed at obtaining a process for discharging a reactor containing both a powder and a gas under pressure, which does not present the disadvantages of the processes belonging to the prior art.

To this end, the present invention relates to a process for discharging a powder from a reactor containing both a powder and a gas under pressure by means of a device including at least one densification zone.

BRIEF DESCRIPTION OF THE DRAWING

The FIGURE is a schematic illustration of a reactor containing a fluidized bed (1), including a valve allowing the reactor containing a fluidized bed to be isolated (2), and a densification zone (3). This densification zone consists of a twin screw (4), arranged in a barrel (5). The screw pitch in the densification zone is gradually decreased.

Also illustrated is a dedensification zone (6), including a twin screw (7) arranged in a barrel (8), kept under nitrogen via a side pipe (9). The screw pitch in the dedensification zone is gradually increased. Finally, the FIGURE also illustrates a terminal zone permitting final discharge of the reactor (10), and a motor (11) enabling the shaft of the screws to rotate.

DETAILED DESCRIPTION OF THE INVENTION

According to the present invention a densification zone means a zone in which the volume available for the powder originating from the reactor is decreased without, however, compacting it. The densification of the powder is preferably accompanied by a decrease in the quantity of gaseous phase originating from the reactor.

Within the scope of the present invention, gas contained in the reactor means any composition containing one or more compounds which are in the gaseous state under the temperature and pressure conditions prevailing in the said reactor.

The process according to the present invention is suitable for discharging a reactor in which one of the reactants is in gaseous phase. Gas phase polymerization reactors may be mentioned as an example of these reactors.

The process according to the invention is also suitable for discharging a fluidized bed reactor. It is particularly suitable for discharging a fluidized bed gas phase polymerization reactor.

The present invention also relates to a device for discharging a powder from a reactor containing both a powder and a gas under pressure, comprising at least one densification zone as defined above.

The preferred devices for discharging according to the present invention include a densification zone in which the densification of the powder takes place during its transfer from the point of connection with the reactor towards the opposite end of the said zone, the said point of connection being generally the point usually employed for discharging the reactor.

When the reactor is a fluidized bed reactor, the point of connection is generally any point situated between the top of the fluidized bed and the fluidization grid. This point is preferably situated in the lower part of the zone thus defined.

The connection between the reactor and the densification zone may be performed by any known means for this purpose. It preferably includes at least one valve enabling the reactor to be isolated.

A densification zone which is particularly suitable consists of at least one Archimedes' screw arranged in a barrel. In this case the rotation of this or these screws ensures the transfer of the powder from the reactor as far as the opposite end of the barrel.

The densification of the powder can then be ensured by a reduction in the pitch of the screw. It can also be ensured by a progressive increase in the diameter of its shaft. The use of an Archimedes' screw which has both a reduction in the pitch and an increase in the diameter of the shaft also falls within the scope of the present invention. The densification zone preferably consists of two co- or counterrotating screws arranged in a barrel and exhibiting a reduction in the pitch of the screws. Densification zones consisting of two corotating screws give particularly good results.

When the densification zone consists of one or more Archimedes' screws, a progressive decrease in the quantity of gaseous phase originating from the reactor and discharged with the powder is observed in parallel with the movement of the powder.

The discharge devices according to the present invention may also include, following the densification zone, a second zone, hereafter called a dedensification zone. According to the present invention a dedensification zone means a zone containing an inert gas at a pressure higher than the pressure prevailing in the reactor, and in which an increase in the volume available for the powder is produced. Also included within the scope of the present invention are discharge devices in which the densification and the dedensification of the powder are performed in a single volume including a densification zone and a dedensification zone, which may or may not be distinct from one another.

The inert gas present in the dedensification zone may, for example, be nitrogen. It replaces all or part of the residual gases originating from the gaseous phase produced in the reactor and which have been entrained with the powder. Since this inert gas is at a pressure which is higher than that prevailing in the polymerization reactor, it also makes it possible to prevent these gases from travelling further forward in the discharge device.

A preferred dedensification zone according to the present invention consists of one or more Archimedes' screws arranged in one or more barrels kept under pressure with an inert gas. In the case of a single screw the increase in the volume available for the powder is ensured by a decrease in the diameter of the shaft of this screw and/or an increase in its pitch. In the case of two co- or counterrotating screws the increase in the volume available for the powder is produced by the increase in the pitch of these screws.

When the densification zone and the dedensification zone consist of one or more Archimedes' screws as described above, the densification and the dedensification of the powder are advantageously performed in a single barrel in which the screw or the screws are arranged and in which the two zones are defined consecutively. By way of example of such a device there may be mentioned a barrel containing two corotating screws and having a first zone in which the pitch of the screws is reduced, followed by a second zone in which the pitch of these screws is increased while the inert gas is introduced through a side pipe.

The devices for discharging according to the invention may include one or more consecutive sequences containing a densification zone and a dedensification zone as they are defined above.

Finally, the discharge devices according to the present invention in most cases end in a zone permitting the final discharging of the reactor. This zone, here called a terminal zone, may be, for example, a zone in which the discharging or the storage of the powder is performed or else an intermediate zone towards the usual devices for granulating or processing the powders.

Also included within the scope of the present invention are the devices containing additional components such as, for example and without any limitation being implied, the components which make it possible to introduce additives into the powder produced in the reactor or components which make it possible to degas a proportion of the gaseous phase present in the said devices and to treat this part of the gaseous phase. Such components may be arranged in any place of the devices according to the present invention. It is noted, nevertheless, that when the devices according to the present invention enable the quantity of gaseous phase originating from the reactor to be decreased, this degassing operation can advantageously be eliminated.

The devices according to the invention are suitable for discharging gas phase polymerization reactors.

They are also suitable for discharging fluidized bed reactors and more particularly those in which one of the reactors is in gaseous phase.

These devices are preferably employed for discharging fluidized bed polymerization reactors.

Good results are obtained by employing the devices according to the present invention for discharging reactors for gas phase polymerization of α-olefins containing from 2 to 22 carbon atoms.

Within the scope of the present invention polymerization of α-olefins means the homopolymerization of the latter or the copolymerization of the latter with each other or with other unsaturated monomers such as, for example, unsaturated organic acids and their derivatives or diolefins, conjugated or otherwise.

The discharge devices according to the present invention are particularly simple and consume little energy. They make it possible to minimize the length of the transitions of the products, since they do not introduce any volumes out of the reactor. Furthermore, they include few valves and consequently require little maintenance and surveillance.

The discharge devices according to the present invention, which make it possible to decrease the quantity of gaseous phase originating from the reactor have an additional advantage in that they make it possible to limit or even to eliminate the disordered reactions capable of taking place in the said devices. In this particular case and as described above, it is furthermore in most cases superfluous to include additional degassing components. Finally, the devices according to the present invention make it possible to perform the treatments of the powders directly after the reactor, and this allows savings to be made in the silos and pneumatic conveyors which are generally necessary for these treatments.

The present invention also relates to a process for discharging a reactor containing both a powder and a gas under pressure by means of the devices described above.

According to the process of the invention a fraction of the powder is discharged, continuously or noncontinuously, into a densification zone in which the volume available for the powder is decreased without, however, compacting it.

At the end of the densification zone powder is in most cases dedensified in a dedensification zone while being diluted with an inert gas. The powder is then optionally transferred into a terminal zone in which the final discharging of the reactor takes place.

Also included within the scope of the present invention are the discharging processes in which a fraction of the powder is discharged into a single volume including a densification zone and a dedensification zone, which may or may not be distinct from each other, before being optionally transferred into the terminal zone.

The transfer into the terminal zone may be performed either directly after the dedensification zone or indirectly through the intermediacy of one or a number of consecutive sequences including a densification zone and a dedensification zone.

The transfer of the powder through the discharge device according to the present invention may be performed by any known means for this purpose.

The discharging of the reactor may be advantageously facilitated by inclining the densification zone so that the end away from the point of connection is situated at a level which is lower than the said point of connection. It is also possible to apply to the discharge device a pressure which is lower than that prevailing in the reactor.

A discharge process which is particularly preferred according to the present invention includes the discharging of a reactor by means of one or more Archimedes' screws arranged in one or more barrels in which a densification zone and a dedensification zone have been defined consecutively and as described above. The densification of the powder is preferably ensured by a decrease in the pitch of the screws. Its dedensification is then ensured by an increase in this pitch. The inert gas may be introduced into the dedensification zone through a side pipe.

In this particular case the transfer of the powder from the reactor as far as the end of the dedensification zone is ensured by rotation of the screws. This rotation must be sufficient to ensure the transfer of the powder without, however, resulting in its compacting. Moreover, it is in most cases chosen so that there is no fusion of the particles of the said powder. A decrease in the quantity of gaseous phase originating from the reactor is observed during this transfer.

The powder is next discharged into a terminal zone.

According to the present invention the reactor is preferably discharged continuously. The quantity of powder discharged per unit time depends on many parameters such as, for example, the point of connection of the densification zone to the reactor, the optional gradient of the said zone, and the optional differences in pressure and/or the speed of rotation of the Archimedes' screws. When the densification zone consists of one or more screws, the speed of rotation of these screws can be adjusted so that the quantity of powder discharged per unit time is equal to the quantity of powder formed within the reactor.

Such a process is suitable for discharging a gas phase polymerization reactor.

It is also suitable for discharging fluidized bed reactors and in particular those in which at least one of the reactants is in gaseous phase. In this case the powder is generally discharged from a point in the reactor situated between the top of the fluid bed and the fluidization grid into the densification zone. This process is preferably used for discharging fluidized bed polymerization reactors. Good results are obtained by using such a process for discharging reactors for gas phase (co)polymerization of $\alpha$-olefins containing from 2 to 22 carbon atoms.

The discharging process according to the invention has many advantages.

It allows easy discharging of a reactor containing a powder and a gas under pressure while the pressure prevailing within this reactor is kept constant. In addition, when the discharging process operates continuously, the rate of discharging can be adjusted as a function of the rate of reaction of the powder formation, and this enables the quantity of powder in the reactor to be kept constant.

Another advantage of the invention is the possibility of considerably decreasing the quantity of gaseous phase originating from the reactor and present in the powder leaving the discharge device. As a result, this powder does not need to undergo additional processing and can be handled without danger. Such an advantage is easily obtained, for example, by adjusting the length of the densification zone and/or the densification zone/dedensification zone sequence number in the discharge device.

It is also found that the discharging of the powders is greatly facilitated. Such an advantage is particularly desirable in the case where sticky powders are discharged.

Finally, the present invention relates to a process for gas phase polymerization by means of a fluidized bed reactor employing the discharge device described above. The polymerization reaction is generally performed by means of a catalyst system containing a compound of a transition metal belonging to groups IIIb, IVb, Vb and VIb of the Periodic Table and which may contain an activator chosen from organometallic compounds of groups I to III of the Periodic Table. The transition metal compound is preferably a titanium-based solid and the organometallic compound is an aluminium compound. The polymerization reaction may also be performed by means of a catalyst based on chromium deposited on a support based on silica.

EXAMPLE

The present invention is illustrated by the following example, which refers to the single figure in which the following are shown diagrammatically:

a fluidized bed reactor—1;

a valve allowing the reactor containing a fluidized bed to be isolated—2;

a densification zone—3. This zone consists of a twin screw—4—arranged in a barrel—5—and whose pitch is gradually decreased;

a dedensification zone—6. This zone also consists of a twin screw—7—arranged in a barrel—8—kept under nitrogen pressure via a side pipe—9—and whose pitch is gradually increased;

the terminal zone permitting the final discharging of the reactor—10;

a motor—11—enabling the shaft of the screws to rotate.

EXAMPLE 1

A fluidized bed reactor—1—for polymerizing propylene with a vertical axis, operating at a pressure of approximately 500 psig (35×10⁵ Pa) and at a temperature between 80 and 110° C. is continuously discharged through a valve—2—and by means of a device including a corotative twin screw consisting of the usual constituent components of extruders with twin corotative screws such as are described in "Schneckenmaschinen in der Verfahrenstechnik" published by Springer Verlag (1972), pages 60–66, 120–128 and 151–154, the content of which is incorporated by reference in the present description. A densification zone—3—and a dedensification zone—6—are arranged consecutively in this twin screw. In the densification zone the pitch of the screws—4—is decreased progressively so that the powder is densified without compacting taking place. It is also found that there is no fusion of the polymer particles. In the dedensification zone, kept at a pressure of 520 psig (36.4× 10⁵ Pa) of nitrogen via the side pipe—9—the pitch of the screws—7—is gradually increased so that the volume available for the powder is increased. The rotation of the twin screw is ensured by a motor—11—and is adjusted so that the height of the top of the fluidized bed stays constant. At the end of the dedensification zone the polymer powder is discharged into a vessel—10.

What is claimed is:

1. A process for discharging a polymer powder from a reactor containing both a polymer powder and a gas under pressure, comprising discharging a polymer powder, which is to be decreased in volume without agglomerating, in a densification zone consisting of at least one Archimedes' screw arranged in a barrel, said screw exhibiting a decrease in the screw pitch.

2. The process according to claim 1, wherein a reactant in said reactor is in gaseous phase.

3. The process according to claim 1, wherein said reactor is a fluidized bed reactor having a fluidization grid.

4. The process according to claim 3, wherein the powder is discharged from a point situated between the top of the fluidized bed and the fluidization grid.

5. The process according to claim 1, wherein said reactor is a polymerization reactor.

6. The process according to claim 3, wherein said reactor is a reactor for gas phase polymerization of α-olefins containing from 2 to 22 carbon atoms.

7. The process according to claim 1, wherein the densification zone consist of two co- or counterrotating screws.

8. The process according to claim 7, wherein the two screws are corotating.

9. The process according to claim 1, wherein the powder is next dedensified in a dedensification zone containing an inert gas at a pressure higher than the pressure prevailing in the reactor and in which the volume available for the powder is increased.

10. The process according to claim 9, wherein the dedensification zone consists of one or more Archimedes' screws arranged in one or more barrels.

11. The process according to claim 10, wherein the densification and the dedensification are performed in a barrel containing two corotating screws which have a first zone in which the pitch of the screws is decreased, followed by a second zone in which the pitch of these screws is increased while the inert gas is introduced through a side pipe.

12. The process according to claim 9, including several sequences of densification and dedensification.

13. The process according to claim 9, including a final step of discharging of the reactor.

14. In a process for the gas phase polymerization of α-olefins, the improvement comprising discharging polymer powder in a densification zone consisting of at least one Archimedes' screw exhibiting a decrease in the screw pitch and arranged in a barrel whereby the volume of said powder is decreased without agglomerating.

15. A process for discharging a polymer powder from a reactor containing both a polymer powder and a gas under pressure, comprising discharging a polymer powder, which is to be decreased in volume without agglomerating, in a densification zone consisting of at least one Archimedes' screw arranged in a barrel, the diameter of the shaft of said screw exhibiting a gradual increase.

16. The process according to claim 15, wherein a reactant in said reactor is in gaseous phase.

17. The process according to claim 15, wherein said reactor is a fluidized bed reactor having a fluidization grid.

18. The process according to claim 17, wherein the powder is discharged from a point situated between the top of the fluidized bed and the fluidization grid.

19. The process according to claim 15, wherein said reactor is a polymerization reactor.

20. The process according to claim 19, wherein said reactor is a reactor for gas phase polymerization of α-olefins containing from 2 to 22 carbon atoms.

21. The process according to claim 15, wherein the densification zone consists of two co- or counterrotating screws.

22. The process according to claim 21, wherein the two screws are corotating.

23. The process according to claim 15, wherein the powder is next dedensified in a dedensification zone containing an inert gas at a pressure higher than the pressure prevailing in the reactor and in which the volume available for the powder is increased.

24. The process according to claim 23, wherein the dedensification zone consists of at least one Archimedes' screw arranged in a barrel.

25. The process according to claim 24, wherein the densification and the dedensification are performed in a barrel containing two corotating screws which have a first zone in which the pitch of the screws is decreased, followed by a second zone in which the pitch of these screws is increased while the inert gas is introduced through a side pipe.

26. The process according to claim 23, including several sequences of densification and dedensification.

27. The process according to claim 23, including a final step of discharging of the reactor.

28. In a process for the gas phase polymerization of α-olefins, the improvement comprising discharging polymer powder in a densification zone consisting of at least one Archimedes' screw arranged in a barrel and having a shaft which exhibits a gradual increase whereby the volume of said powder is decreased without agglomerating.

* * * * *

UNITED STATES PATENT AND TRADEMARK OFFICE
CERTIFICATE OF CORRECTION

PATENT NO. : 5,939,027
DATED : August 17, 1999
INVENTOR(S) : Jean Jacques RUELLE It is certified that error appears in the above-identified patent and that said Letters Patent is hereby corrected as shown below:

On the title page, item

[73] Assignee: Change the name of the Assignee from [Solvay Polyoletins Europe-Belsium] to --Solvay Polyolefins Europe-Belgium--.

Signed and Sealed this

First Day of February, 2000

Attest:

Q. TODD DICKINSON

Attesting Officer

Acting Commissioner of Patents and Trademarks